United States Patent
Spletzer et al.

(10) Patent No.: US 6,919,909 B1
(45) Date of Patent: Jul. 19, 2005

(54) FRACTIONAL SCREEN VIDEO ENHANCEMENT APPARATUS

(75) Inventors: Barry L. Spletzer, Albuquerque, NM (US); George S. Davidson, Albuquerque, NM (US); Daniel J. Zimmerer, Tijeras, NM (US); Lisa C. Marron, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 261 days.

(21) Appl. No.: 09/695,809

(22) Filed: Oct. 24, 2000

(51) Int. Cl.[7] .............................................. G09G 5/00
(52) U.S. Cl. ....................................... 345/632; 345/634
(58) Field of Search .......................... 345/7, 8, 1.3, 629, 345/632, 633, 634, 638, 3.3; 348/154; 349/61

(56) References Cited

U.S. PATENT DOCUMENTS

| | | | |
|---|---|---|---|
| 5,278,681 A | * | 1/1994 | Gitlin et al. .................. 349/61 |
| 5,625,410 A | * | 4/1997 | Washino et al. ............. 348/154 |
| 5,956,000 A | * | 9/1999 | Kreitman et al. ............. 345/1.3 |
| 6,549,215 B2 | * | 4/2003 | Jouppi ........................ 345/660 |

OTHER PUBLICATIONS

Computer Controlled Pan–Tilt Unit, Model PTU User's Manual, Version 1.10, Apr. 16, 1998, *Directed Perception, Inc.*

PROXIMA®, Desktop Projector™ 9200 User'Guide, Sep. 1997.

* cited by examiner

*Primary Examiner*—Chanh Nguyen
(74) *Attorney, Agent, or Firm*—William R. Conley; Fred A. Lewis; V. Gerald Grafe

(57) ABSTRACT

The present invention provides a method and apparatus for displaying two portions of an image at two resolutions. For example, the invention can display an entire image at a first resolution, and a subset of the image at a second, higher resolution. Two inexpensive, low resolution displays can be used to produce a large image with high resolution only where needed.

9 Claims, 2 Drawing Sheets

FRACTIONAL SCREEN VIDEO ENHANCEMENT APPARATUS

This invention was made with Government support under Contract DE-AC04-94AL85000 awarded by the U.S. Department of Energy. The Government has certain rights in the invention.

BACKGROUND OF THE INVENTION

This invention relates to the field of displays using multiple projectors to provide enhanced resolution.

Conventional displays can be characterized by their resolution. Generally, higher resolution means higher display system cost. In many display applications, however, higher resolution is needed for only portions of the overall image. For example, in display of a sporting event, only a limited region (e.g., the pitcher and batter in a baseball game) benefits from high resolution at any given time. As another example, in a display of a computer image, only the portion currently being inspected needs to be displayed in high resolution. In both examples, low resolution display of the surrounding context can aid understanding of the portion displayed at high resolution. Also, the portion that benefits from high resolution display can change with time (the batter hits the ball and begins running the bases in the baseball game example). A conventional display with sufficient resolution for the high resolution portion can be more expensive; a conventional display at lower cost can be incapable of the high resolution needed for some portions of the image.

Accordingly, there is a need for a display method and apparatus that can display portions of an image at a higher resolution and the rest at lower resolution, without incurring the cost associated with displaying the entire image at the higher resolution.

DESCRIPTION OF THE FIGURES

The accompanying drawings, which are incorporated into and form part of the specification, illustrate embodiments of the invention and, together with the description, server to explain the principles of the invention.

DETAILED DESCRIPTION OF THE INVENTION

The present invention provides a method and apparatus for displaying two portions of an image at two resolutions. For example, the invention can display an entire image at a first resolution, and a subset of the image at a second, higher resolution. Two inexpensive, low resolution displays can be used to produce a large image with high resolution only where needed.

Figure 1:
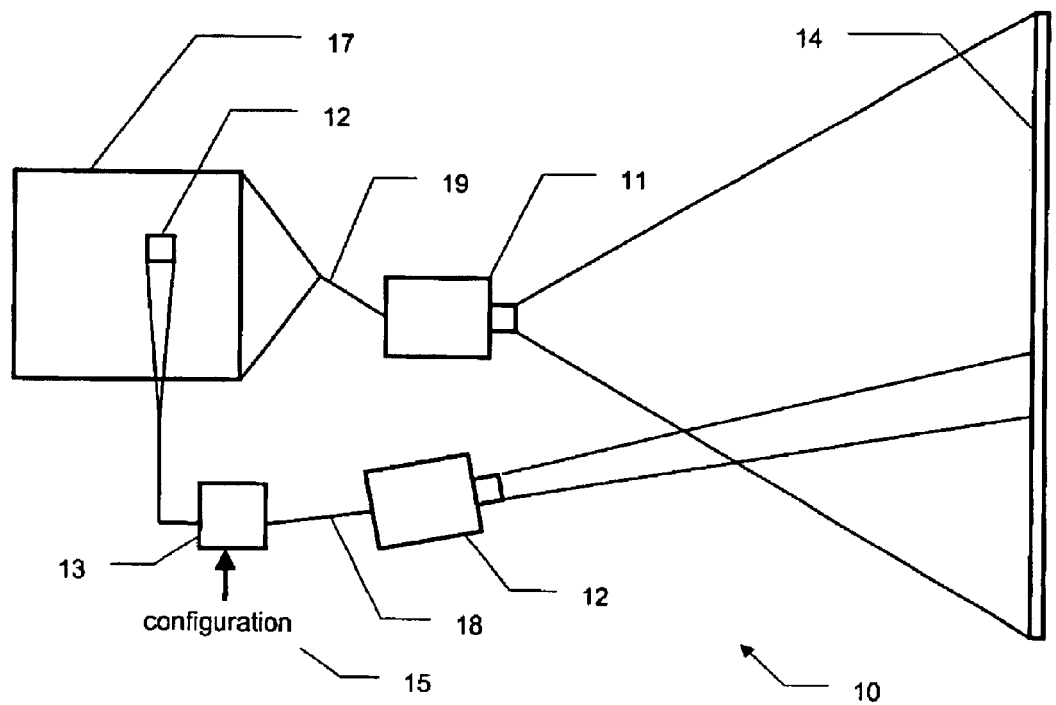
FIG. 1 is a schematic representation of a video display system according to the present invention.

FIG. 1 is a schematic representation of a video display system 10 according to the present invention. Video display system 10 comprises first 11 and second 12 video sources, arranged relative to a display medium 14. First video source 11 accepts input corresponding to a first portion 16 of an image to be displayed. An image transformer 13 accepts input corresponding to a second portion 17 of the image to be displayed and information defining the configurations of the first 11 and second 12 video sources and the display medium 14. Image transformer 13 generates a signal input to second video source 12 compensated for the configurations such that the resulting display of the second portion on the display medium is aligned with the display of the first portion on the display medium.

FIRST AND SECOND PORTIONS OF THE IMAGE

The first and second portions of the image can be any portions of the image, including the entire image. For example, the first portion can be an entire image to be displayed, and the second portion can be a subset of the entire image that requires display in higher resolution. The first portion can be, for example, a display of a camera image while the second portion is a subset of the camera image deserving specific attention (e.g., where motion occurs, or where detailed features are present). The first and second portions can change with time. In the entire image/subset example, the entire image can change with time, as with a panning camera or an animated computer display. The subset can also change with time, both in content (as the image itself changes) and in relation to the entire image (as the subset deserving attention moves relative to the image). Motion of the second portion relative to the entire image can follow, as examples, a viewer's eye movements, motion of a pointing device, and motion of an onscreen object (such as a ball in a sporting event).

DISPLAY MEDIUM

The display medium can be of any form compatible with the video sources. As examples, rear projection displays, screens, and suitable wall surfaces can each server as a display medium.

FIRST VIDEO SOURCE

Those skilled in the art know a variety of suitable video sources suitable for use in various settings. Any combination of display technology that would be capable of displaying 2 different resolutions on the same screen may be used. Examples of suitable image display sources include rear projection systems, cathode ray tube (CRT), LCD, Digital Light Projectors (DLP), and plasma displays. The first video source can be operated in a conventional method to display a larger, lower resolution image. The mounting and alignment of the two video sources depends on the type of display sources, optical properties (such as focal length and depth of focus), image steering apparatus, and the geometry of the system.

In the example implementation described below, the two projectors were rigidly mounted to a base to reduce the degrees of freedom of the system. The main projector was set approximately perpendicular to the display screen to limit distortion of the main image. However, this is not necessary. The transform ($T_L$) compensates for linear distortion in overall transform. If the projection surface (screen) is planar, then homogeneous transforms can be used. Otherwise, more complex transforms can be required.

The second projector was mounted so that the focal range would coincide with the display screen after reflection from the mirror, and such that the optical axis of the lens intersects the mirror coordinate system at the origin. The angles between the projects are arbitrary, and were chosen to restrict the overall size of the apparatus.

SECOND VIDEO SOURCE

The second video source can be any of a variety of video sources as discussed above. The second video source can be mounted so that its display corresponds to only a subset of the region covered by the display of the first video source. If the second portion of the image is mobile with respect to the first portion, then the second video source must be able to adjust the placement of its display relative to the display of the first video source.

A conventional video source can be combined with an image steerer to provide the second video source. The image steerer directs the output of the conventional video source to the appropriate portion of the display medium. As examples, an image steerer can comprise a movable mirror, a controllable optical transmitter, or a micro-electromechanical device. A conventional video source can also be mounted mobile with respect to the display medium, allowing the output to be directed to the appropriate portion of the display medium by movement of the video source.

IMAGE TRANSFORMER

Figure 2:
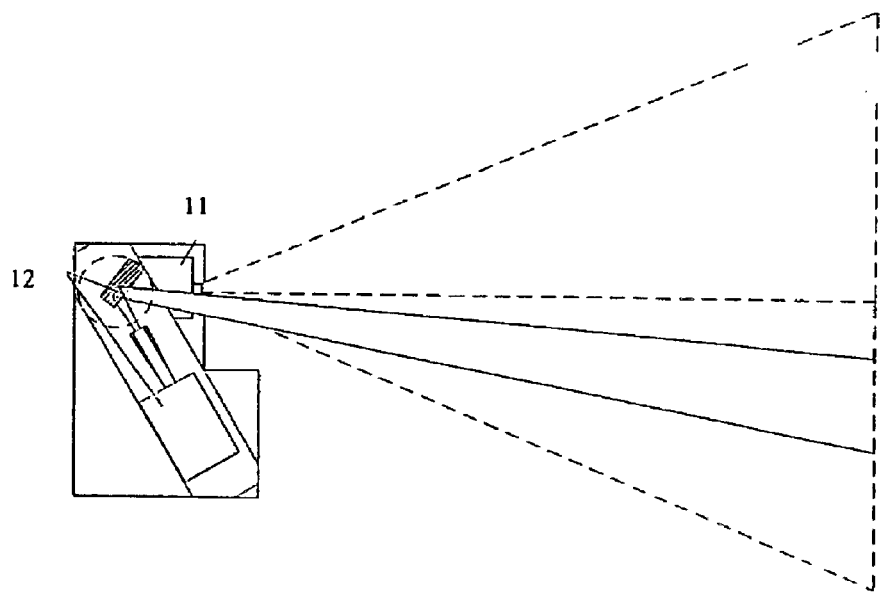
FIG. 2 is a schematic representation of a video display system according to the present invention.

The second portion of the image travels a different path to the display medium than does the first portion. Accordingly, the display of the second portion can be adjusted to achieve proper registration between the two portions. In the discussion below, it is assumed that the second portion is directed toward the display medium by a gimbal-mounted mirror, controlled by computer commands to stepper motors, as shown in FIG. 2. Those skilled in the art will appreciate similar image transformations suitable for other mechanisms directing the second portion to the display medium.

The output of the second video source can undergo significant distortions depending on the location on the display medium to which it is projected. These distortions can include skew, rotation, and anisotropic stretching. The second portion can be transformed before reaching the second video source so that, after all the distortion, the display on the display medium is properly registered. The transformation can be complex, but, since ray tracing from the object plane of the second video source to the display medium involves classical projection, rotation, and reflection, the transformation can be expressed as a single homogeneous transform. Development of such transforms is discussed below.

BASIC HOMOGENEOUS TRANSFORMS

Homogeneous transforms can provide a powerful mathematical tool for converting between coordinate systems and determining the projection of images. A homogeneous transform comprises a 4×4 matrix that operates on a four element homogeneous coordinate vector. The first three elements of the homogeneous coordinate vector are the usual x, y, and z components used to describe a three-dimensional point. The fourth component (d) allows projection information to be carried along with the three-dimensional point. For a point in actual space this fourth component is always equal to 1. The usefulness of this fourth component and its physical meaning will become more clear later.

Homogeneous transforms are true matrices. Accordingly, they are amenable to various matrix operations; for example, several simple transforms can be multiplied together to produce a more complex transform. A homogeneous transform can be understood by examining some of the basic components that can contribute to the transform. The first of these is translation of the coordinate system origin. An origin translation transform has the form shown in Equation 1.

$$\begin{bmatrix} b_x \\ b_y \\ b_z \\ 1 \end{bmatrix} = \begin{bmatrix} 1 & 0 & 0 & t_x \\ 0 & 1 & 0 & t_y \\ 0 & 0 & 1 & t_z \\ 0 & 0 & 0 & 1 \end{bmatrix} \begin{bmatrix} s_x \\ s_y \\ s_z \\ 1 \end{bmatrix} \quad \text{Equation 1}$$

The transform of Equation 1 converts a general point in the s coordinate system to the b coordinate system. Examining the operation shown in Equation 1. the general point in the vector t is simply added to the point expressed in the s system. This constitutes a translation transform where the vector t is defined as the vector from the origin of the b system to the s system. Rather than writing on all the elements explicitly, this translation homogeneous transform can be defined as in Equation 2.

$$O(b,s) = \begin{bmatrix} 1 & 0 & 0 & t_x \\ 0 & 1 & 0 & t_y \\ 0 & 0 & 1 & t_z \\ 0 & 0 & 0 & 1 \end{bmatrix} \quad \text{Equation 2}$$

In addition to translation, rotation between two coordinate systems can be defined by the homogeneous transform of Equation 3, where C is a point expressed in the c coordinate system and B is the identical point expressed in the b coordinate system $$B = \begin{bmatrix} \hat{b}_x \cdot \hat{c}_x & \hat{b}_x \cdot \hat{c}_y & \hat{b}_x \cdot \hat{c}_z & 0 \\ \hat{b}_y \cdot \hat{c}_x & \hat{b}_y \cdot \hat{c}_y & \hat{b}_y \cdot \hat{c}_z & 0 \\ \hat{b}_z \cdot \hat{c}_x & \hat{b}_z \cdot \hat{c}_y & \hat{b}_z \cdot \hat{c}_z & 0 \\ 0 & 0 & 0 & 1 \end{bmatrix} C \quad \text{Equation 3}$$

All of the elements of this rotation vector are made up of dot products between the unit vectors of the b and c coordinate systems. The notation used here for this rotational homogeneous transform is shown in Equation 4a.

$$R(b,c) = \begin{bmatrix} \hat{b}_x \cdot \hat{c}_x & \hat{b}_x \cdot \hat{c}_y & \hat{b}_x \cdot \hat{c}_z & 0 \\ \hat{b}_y \cdot \hat{c}_x & \hat{b}_y \cdot \hat{c}_y & \hat{b}_y \cdot \hat{c}_z & 0 \\ \hat{b}_z \cdot \hat{c}_x & \hat{b}_z \cdot \hat{c}_y & \hat{b}_z \cdot \hat{c}_z & 0 \\ 0 & 0 & 0 & 1 \end{bmatrix} \quad \text{Equation 4a}$$

The rotational transform and origin translation transform can be combined to perform a complete coordinate system transform as in Equation 4b.

$$C(b,c) = O(b,c)R(b,c) \quad \text{Equation 4b}$$

In addition to rotation and translation scaling may be accomplished by a homogeneous transform. Simple isotropic scaling is done by multiplying each of the three components by a fixed scale factor f. The scaling transform is defined as in Equation 5.

$$S(f) = \begin{bmatrix} f & 0 & 0 & 0 \\ 0 & f & 0 & 0 \\ 0 & 0 & f & 0 \\ 0 & 0 & 0 & 1 \end{bmatrix} \quad \text{Equation 5}$$

The next basic transform is a projection transform which uses the bottom row of the homogeneous transform. Before presenting the form of this transform, some explanation of the fourth element (d) of a homogeneous coordinate can be useful.

As mentioned before, a point in space can be represented by the usual xyz coordinates and a d value of 1. The definition of homogeneous coordinates states that any four element coordinate can be converted into a point in space by dividing all four elements by the value of d. By defining this as a valid operation on a homogeneous coordinate the ratios between the first three elements are invariant. This means that a homogeneous coordinate describes a line passing through the origin from which the point is measured and through the actual point in space. This property makes homogeneous coordinates very useful for calculating projections. If the origin of the coordinate system is moved to the observation point or perspective point then the homogeneous coordinate of a point defines a line that passes through the point in space and through the observation point. By definition, this line is the projection of the actual point through the observation point.

Figure 3:
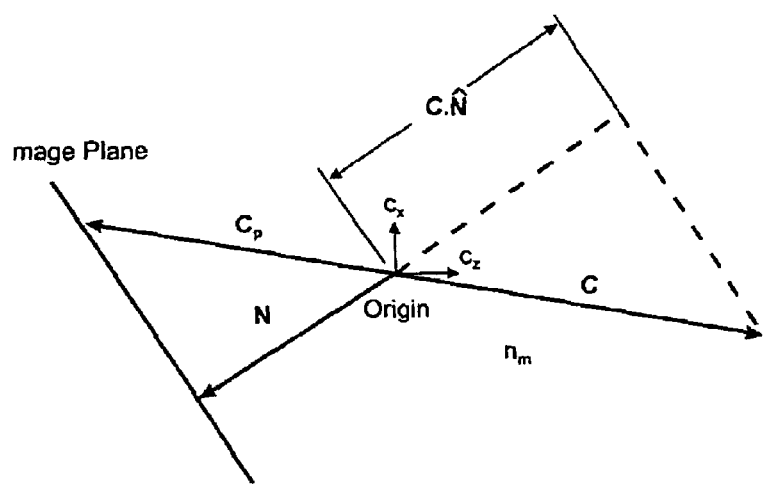
FIG. 3 is an illustration of geometrical relationship relevant to the present invention.

Using the projection transform, the homogeneous representation with respect to the origin can be produced for any point. By adjusting the fourth coordinate, any point along the line passing through the original point and the origin can be represented. Specifically, consider the value of the fourth coordinate required to represent the point where the line intersects a plane. The plane is completely defined by the vector N that connects the origin to the image plane and is normal to the image plane. FIG. 3 illustrates the geometry of this situation. The original point C is measured with respect to the origin placed at the observation point. The vector $C_p$ is the projection of the point onto the plane.

Similar triangles lead to Equation 6.

$$\frac{C \cdot \hat{N}}{N} = \frac{C}{C_p} \qquad \text{Equation 6}$$

The vector C can be scaled to represent $C_p$ as in Equation 7.

$$C_p = C \frac{C_p}{C} = C \frac{N}{C \cdot \hat{N}} = C \frac{N \cdot N}{C \cdot N} = C \left( \frac{1}{C \cdot \frac{N}{N \cdot N}} \right) \qquad \text{Equation 7}$$

By the definition of homogeneous coordinates, the fourth coordinate (d) can be divided into the homogeneous representation to create a point in space. Therefore, to convert the point C to the point Cp, only the value of d need be modified. The value of d required to perform the conversion is given by Equation 8.

$$d = \frac{C \cdot N}{N \cdot N} = C \cdot M \qquad \text{Equation 8}$$

The vector M can be completely determined from the projection plane definition N as in Equation 9.

$$M = \frac{N}{N \cdot N} \qquad \text{Equation 9}$$

The bottom row of the homogeneous transformation can be used to produce this value. The first three components of the bottom row operate on the vector to produce a dot product. The fourth component must be 0 so that the proper value of d is obtained. This results in a transform of Equation 10, which is the complete projection transform.

$$P(n) = \begin{bmatrix} 1 & 0 & 0 & 0 \\ 0 & 1 & 0 & 0 \\ 0 & 0 & 1 & 0 \\ \frac{n_x}{n \cdot n} & \frac{n_y}{n \cdot n} & \frac{n_z}{n \cdot n} & 0 \end{bmatrix} \qquad \text{Equation 10}$$

The final basic transform is the zoom transform, which consists of the identity matrix with a zoom value in the lower right element. The zoom value is a multiplier of the input d value of the homogeneous coordinate. Since the d value can be divided into the homogeneous coordinate to produce a point in space the zoom factor is the isotropic scaling of the distance from the origin to the input point. After the transform, the distance to the point is 1/z times the distance to the original point. The zoom transform as defined as in Equation 11.

$$Z(z) = \begin{bmatrix} 1 & 0 & 0 & 0 \\ 0 & 1 & 0 & 0 \\ 0 & 0 & 1 & 0 \\ 0 & 0 & 0 & z \end{bmatrix} \qquad \text{Equation 11}$$

One more transform is needed to completely analyze the system. This is the transform resulting from reflection in a mirror. The nature this transform will be determined here based on a vector analysis of reflection. The position of the mirror can be completely described by the normal vector (n) to the mirror. In general this normal vector will be known and the resulting transform is desired. Unlike previous transforms which expressed a given point in a second coordinate system, the mirror transform takes a point in the original coordinate system and expresses location of the reflected image of that point in the original system (virtual point).

The development of a transform to handle mirror reflection requires the determination of the relationship between the incident coordinate system and the reflected coordinate system. To simplify this determination, place the origin of both coordinate systems coincident on the mirror. The z-axis (k) of the incident system points towards the mirror. The required rotation to produce the reflected system must be determined. The notation for the reflected system will be to add a prime (') to the notation of the incident system. The law of reflection gives Equation 12.

$$\hat{k}' = \hat{k} - (2\hat{k} \cdot \hat{n})\hat{n} = \hat{k} - 2n_z \hat{n} \qquad \text{Equation 12}$$

The equation of the mirror plane is given in Equation 13, where A is any vector lying in the mirror plane.

$$A \cdot \hat{n} = 0 \qquad \text{Equation 13}$$

To determine the direction of the reflected x-axis, consider the projection of a ray parallel to the z-axis but displaced one unit in the x direction. The intersection of this ray and of the z-axis with the mirror creates two points, which define the projection of the x-axis onto the mirror. The vector representing this projection can be determined by noting the equation of the incoming ray, given in Equation 14.

$$x=1, y=0 \qquad \text{Equation 14}$$

Solving for the z coordinate of the intersection of the ray with the mirror plane yields Equation 15.

$$(\hat{i}+z\hat{k})\cdot\hat{n}=0 \quad z=-\frac{n_x}{n_z}$$ 
Equation 15

The projection of the x-axis onto the mirror ($i_m$) has the above x, y, and z components as in Equation 16.

$$\hat{i}_m=\hat{i}-\frac{n_x}{n_z}\hat{k}$$
Equation 16

This vector, when viewed from the k'direction, constitutes the x'-axis. The $i_m$ vector can be projected into the plane perpendicular to the k'direction by subtracting the component of the vector parallel to k'. This results in the expression for i' in Equation 17.

$$\hat{i}'=\hat{i}_m-(\hat{i}_m\cdot\hat{k}')\hat{k}'$$
Equation 17

Equation 17 shows i' as a unit vector. This is true because an object is not foreshortened by reflection So that the magnitude of the reflected vector is the same as the incoming vector as long as the view direction relative to the vector remains the same. Combining this expression with the above relationships gives Equation 18.

$$\hat{i}'=\hat{i}_m-\left(\left[\hat{i}-\frac{n_x}{n_z}\hat{k}\right]\cdot\hat{k}'\right)\hat{k}'$$

$$\hat{i}'=\hat{i}-\frac{n_x}{n_z}\hat{k}-(\hat{i}\cdot\hat{k}')\hat{k}'+\left[\frac{n_x}{n_z}\hat{k}\cdot\hat{k}'\right]\hat{k}'$$
Equation 18

Evaluating some useful subexpressions gives Equation 19.

$$\hat{i}\cdot\hat{k}'=\hat{i}\cdot[\hat{k}-(2\hat{k}\cdot\hat{n})\hat{n}]=-(2\hat{k}\cdot\hat{n})(\hat{i}\cdot\hat{n})$$

$$\hat{k}\cdot\hat{k}'=\hat{k}\cdot[\hat{k}-(2\hat{k}\cdot\hat{n})\hat{n}]=1-2(\hat{k}\cdot\hat{n})^2$$
Equation 19

Combining yields Equation 20.

$$\hat{i}'=\hat{i}-\frac{n_x}{n_z}\hat{k}+2(\hat{k}\cdot\hat{n})(\hat{i}\cdot\hat{n})\hat{k}'+\frac{n_x}{n_z}[1-2(\hat{k}\cdot\hat{n})^2]\hat{k}'$$

$$\hat{i}'=\hat{i}-\frac{n_x}{n_z}2(\hat{k}\cdot\hat{n})\hat{n}+2(\hat{k}\cdot\hat{n})\left(\hat{i}\cdot\hat{n}-(\hat{k}\cdot\hat{n})\frac{n_x}{n_z}\right)\hat{k}'$$

$$\hat{i}'=\hat{i}-\frac{n_x}{n_z}2(\hat{k}\cdot\hat{n})\hat{n}+2(\hat{k}\cdot\hat{n})\left(\hat{i}\cdot\hat{n}-(\hat{k}\cdot\hat{n})\frac{n_x}{n_z}\right)[\hat{k}-(2\hat{k}\cdot\hat{n})\hat{n}]$$
Equation 20

Since all the indicated dot products with the mirror normal have one of the original unit vectors as a component, they can be replaced by the components of the mirror normal unit vector as in Equations 21 and 22.

$$\hat{i}'=\hat{i}-\frac{n_x}{n_z}2n_z\hat{n}+2n_z\left(n_x-n_z\frac{n_x}{n_z}\right)[\hat{k}-(2n_z)\hat{n}]$$
Equation 21

$$\hat{i}'=\hat{i}-2n_x\hat{n}$$
Equation 22

From this, the homogeneous transformation matrix of a mirror can be developed. This matrix consists solely of rotation with the origin of both systems located coincident on the mirror surface as shown in Equation 23.

$$M(n)=\begin{bmatrix}1-2n_x^2 & -2n_xn_y & -2n_xn_z & 0\\ -2n_xn_y & 1-2n_y^2 & -2n_yn_z & 0\\ -2n_xn_z & -2n_yn_z & 1-2n_z^2 & 0\\ 0 & 0 & 0 & 1\end{bmatrix}$$
Equation 23

The notation and description of each of the required contributing transforms is summarized in Table 1.

TABLE 1

| Transform | Symbol | Description |
|---|---|---|
| Origin translation | O(b, c) | Translates coordinates from origin of c system to origin of b system |
| Coordinate rotation | R(b, c) | Converts coordinates from c system to b system provided that the system origins are coincident |
| Coordinate conversion | C(b, c) | Convert coordinates from c system to b system accounting for both rotation and translation |
| Isotropic scaling | S(f) | Isotropically scales coordinate values by factor f |
| Projection | P(N) | Projects points from three-dimensional space onto an image plane where N is the vector from the coordinate system origin to the image plane and normal to the image line |
| Zoom | Z(z) | Scales three-dimensional points so the resulting point lies along the original line connecting the origin with the point but at a fraction 1/z from the origin |
| Mirror reflection | M(n) | Determines the image of the original point has seen in a mirror based on the unit normal n to the mirror |

IMAGE PROJECTION USING HOMOGENEOUS TRANSFORMS

Figure 4:
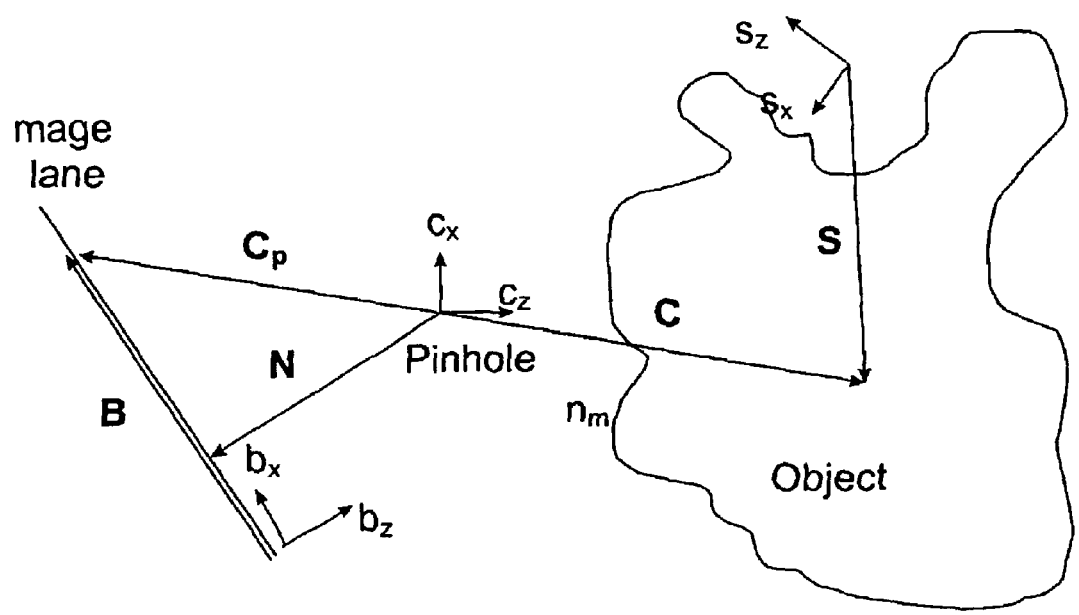
FIG. 4 is a schematic representation of image projection associated with the present invention.

Before tackling the more difficult problem of two projectors and a mirror, consider the problem of producing a projection of an object onto an image plane. This requires that all rays from the object to the image plane pass through the pinhole or observation point. The intersection of such a ray with the image lane is the projected image of the original point. FIG. 4 shows this schematically. A single homogeneous transform can be constructed to perform this operation by combining several of the previously discussed basic transforms.

In the figure, the points in the object are originally expressed in the S coordinate system. The homogeneous coordinate representation of the general vector S is given in Equation 24.

$$S=\begin{bmatrix}s_x\\ s_y\\ s_z\\ 1\end{bmatrix}$$
Equation 24

The 1 for the fourth element means that the actual values of the vector S are used here. First, construct a simple rotation and translation transform to convert from the S coordinate system to the C coordinate system with the origin at the pinhole. This transform is in Equation 25.

$$C=C(c,s)S$$
Equation 25

In this transform, c and s refer to the appropriate unit vectors of the two coordinate systems and $s_0$ is the vector from the origin of c to the origin of s measured in the c coordinate system. Using this transform, the homogeneous representation with respect to the pinhole can be produced for any point in the original object. By adding a projection transform the coordinates of any point in the image plane can be determined, as in Equation 26.

$$C_P = P(N)C(c,s)S \qquad \text{Equation 26}$$

This gives the coordinates of all points projected onto the image plane in the pinhole coordinate system. One final conversion is needed and that is to convert the coordinate system reference to the image plane (b). This transformation has the same form as the transformation between the s and c system earlier. Adding the appropriate rotation and translation transforms results in Equation 27.

$$B = C(b,c)P(N)C(c,s)S \qquad \text{Equation 27}$$

This result provides the homogeneous coordinates in the image plane coordinate system. In general the value of the fourth element (d) will not be 1.0 and all elements in the resulting vector must be divided by d to yield the actual point in space.

EXPERIMENTAL DETERMINATION OF HOMOGENEOUS TRANSFORMS

The previous derivation shows that a single homogeneous transform does exist to perform the projection. However, since it is constructed from many basic transforms multiplied together, the relatively simple components that make up each transform and the usual association of areas of the transform with rotation, translation, perspective, and zoom will in general be lost. The overall transform can be determined experimentally without any advance knowledge of the contributing parameters. Equation 28 gives the completely general form of a homogeneous transform.

$$\begin{bmatrix} b_x d \\ b_y d \\ b_z d \\ d \end{bmatrix} = \begin{bmatrix} t_{11} & t_{12} & t_{13} & t_{14} \\ t_{21} & t_{22} & t_{23} & t_{24} \\ t_{31} & t_{32} & t_{33} & t_{34} \\ t_{41} & t_{42} & t_{43} & t_{44} \end{bmatrix} \begin{bmatrix} s_x \\ s_y \\ s_z \\ 1 \end{bmatrix} \qquad \text{Equation 28}$$

Point-by-point measurements in the s and b coordinate systems can be made to experimentally determine the transform for a given system. Each point measurement will yield three new scalar equations but introduce one additional unknown, that being d which is unique for each point. Because of this, each measured point will provide information to solve for two additional unknowns. The set of equations resulting from these measurements is homogeneous. However, each element in the transformation matrix can be divided by a constant without altering the result. This is because of the scaling factor d. Dividing each element by a constant divides the resulting value of d and the values of $b_x d$, $b_y d$, and $b_z d$ by the same constant so that the determination of the final coordinate is unaffected. Doing this results in the set of linear equations for each measured three-dimensional point shown in Equations 29.

$$\begin{bmatrix} s_x & s_y & s_z & 1 & 0 & 0 & 0 & 0 & 0 & 0 & 0 & 0 & -b_x s_x & -b_x s_y & -b_x s_z \\ 0 & 0 & 0 & 0 & s_x & s_y & s_z & 1 & 0 & 0 & 0 & 0 & -b_y s_x & -b_y s_y & -b_y s_z \\ 0 & 0 & 0 & 0 & 0 & 0 & 0 & 0 & s_x & s_y & s_z & 1 & -b_z s_x & -b_z s_y & -b_z s_z \end{bmatrix} \qquad \text{Equation 29}$$

$$\begin{bmatrix} t_{11} \\ t_{12} \\ t_{13} \\ t_{14} \\ t_{21} \\ t_{22} \\ t_{23} \\ t_{24} \\ t_{31} \\ t_{32} \\ t_{33} \\ t_{34} \\ t_{41} \\ t_{42} \\ t_{43} \end{bmatrix} = \begin{bmatrix} b_x \\ b_y \\ b_z \end{bmatrix}$$

The 16th value of the transformation matrix, $t_{44}$, is set to 1.0. A set of these three independent equations can be constructed from any measured point where a coordinate in the S system is measured and corresponds to a known point in the B system. This way, in the general case, at least five points can be measured by completely determine the transformation. Since all the equations are linear with respect to the unknown coefficients, linear regression techniques (discussed later) can be used to reduce the error in the resulting transform by measuring additional points. In the specific case of interest, points in both the S and the B coordinate systems are constrained to a plane so that $b_z$ and $s_z$ are always zero. This reduces the equations to be solved to Equation 30.

$$\begin{bmatrix} s_x & s_y & 1 & 0 & 0 & 0 & -b_x s_x & -b_x s_y \\ 0 & 0 & 0 & s_x & s_y & 1 & -b_y s_x & -b_y s_y \end{bmatrix} \begin{bmatrix} t_{11} \\ t_{12} \\ t_{14} \\ t_{21} \\ t_{22} \\ t_{24} \\ t_{41} \\ t_{42} \end{bmatrix} = \begin{bmatrix} b_x \\ b_y \end{bmatrix}. \qquad \text{Equation 30}$$

This set of equations provides solutions for only eight of the required 15 components. The seven undetermined components are used only as multipliers of the z components or to determine the z value of component. This set of equations shows that a minimum of four points can be required to completely determine the transform between the two planar coordinate systems and, as before, additional points can be used to provide a best fit transform.

The use of only a minimum number of points can allow small errors in measurement to introduce very large errors in the resulting transform. Measuring many extra points and performing linear regression on the data can reduce the errors. The determination of the homogeneous transform via linear regression can proceed as follows. For each point measured on the system the left and right-most matrics can be augmented by adding to new rows. For example, if only three points are measured than the resulting equations set is as in Equation 31.

$$\begin{bmatrix} sl_x & sl_y & 1 & 0 & 0 & 0 & -bl_xsl_x & -bl_xsl_y \\ 0 & 0 & 0 & sl_x & sl_y & 1 & -bl_ysl_x & -bl_ysl_y \\ s2_x & s2_y & 1 & 0 & 0 & 0 & -b2_xs2_x & -b2_xs2_y \\ 0 & 0 & 0 & s2_x & s2_y & 1 & -b2_ys2_x & -b2_ys2_y \\ s3_x & s3_y & 1 & 0 & 0 & 0 & -b3_xs3_x & -b3_xs3_y \\ 0 & 0 & 0 & s3_x & s3_y & 1 & -b3_ys3_x & -b3_ys3_y \end{bmatrix} \begin{bmatrix} t_{11} \\ t_{12} \\ t_{14} \\ t_{21} \\ t_{22} \\ t_{24} \\ t_{41} \\ t_{42} \end{bmatrix} = \begin{bmatrix} bl_x \\ bl_y \\ b2_x \\ b2_x \\ b3_x \\ b3_x \end{bmatrix} \quad \text{Equation 31}$$

Equation 32 represents this symbolically.

$$s\ t = b \quad \text{Equation 32}$$

The solution for the transform elements t using linear regression is as in Equation 33.

$$t = (s^Ts)^{-1}(s^Tb) \quad \text{Equation 33}$$

This solution for the transform works equally well for the two-dimensional case where the eight elements of t are solved or for the three-dimensional case that solves for all 15 elements. In either case, $t_{44}$ can be set equal to 1 without any loss of generality.

CONSTRUCTION OF THE COMPLETE TRANSFORM

Combining the ability to experimentally determine the homogeneous transform for overall system with the property of combining basic transforms to produce a complex transform allows the needed transforms to be constructed. The method can be complex because the movement of the mirror alters the transform in a complex way.

The determination of the complete transform by measuring individual points can be done for a transform between the two projectors just as well as from one projector to the screen. Several intermediate coordinate systems can be convenient for this analysis; these are shown in Table 2.

TABLE 2

| Symbol | System description | Alignment |
|---|---|---|
| b | small image projector object plane | z normal to object plane |
| L | large image projector object plane | z normal to object plane |
| s | Projection screen | z normal to screen, origin along the mirror z axis, $s_x$ parallel to $m_x$ and $s_z$ parallel to $m_z$ |
| $P_b$ | small projector pinhole | Unimportant |
| $P_L$ | large projector pinhole | Unimportant |
| m | mirror system | z parallel to screen normal, origin at mirror axis |
| $P_v$ | small projector virtual pinhole | Unimportant |

The reasons for the various coordinate system alignment will be explained in this section. The techniques for achieving this alignment will be explained later.

For the final system a number of calibration points can be measured to determine a specific transform. This is not sufficient since the transform is a function of the mirror position. Instead, the transform resulting from the calibration points must be decomposed to allow subsequent transforms to be constructed as a function of mirror position without additional measurements being required. The complete transform at any position can be expressed as a product of three transforms. The first of these three is the right transform ($T_R$), in Equation 34, which transforms from the small projector object plane to the mirror coordinate system.

$$T_R = C(m, P_b) C(P_b, b) \quad \text{Equation 34}$$

This is a direct coordinate transformation where all coordinate systems are fixed relative to each other so the transform is constant. The second is the center transform ($T_c$), in Equation 35, which converts from the mirror coordinate system to the screen.

$$T_C = C(s,m)O(m,P_v)P(N)O(P_v,m)M(n) \quad \text{Equation 35}$$

This transform requires some explanation. Going through the steps in sequence from right to left, the transform begins with a point on the small projector object plane expressed in the mirror coordinate system. Applying the M(n) transform gives the coordinates of the image of the point as seen in the mirror. The next transform, $O(P_v,m)$, translates the coordinate system back to the virtual pinhole. From here, a projection transform P(N) converts the original point to the coordinates of the point projected onto the screen. The vector N is defined as the normal vector to the screen from the origin of the virtual pinhole system which is the virtual pinhole itself. Part of the difficulty in determining this center transform is the fact that the position of the virtual pinhole changes with changing mirror position. After the points are projected, the origin translation transform $O(m,P_v)$ converts back to the mirror coordinate system. The final basic transform C(s,m) converts the projected points into screen coordinates.

The final transform is the left transform ($T_L$), in Equation 36, which converts from the screen to the large projector object plane.

$$T_L = C(L,P_L)C(P_L, s) \quad \text{Equation 36}$$

This is similar in form to the right transform and is a coordinate transformation between two fixed systems. Here however the constant value of the transform is dependent on the screen position relative to the projector box. Unlike the right transform which need only be measured once for a projector configuration, this transform can need to be determined for each screen setup.

This division into three transforms to chosen because the center transform contains all the variables resulting from the repositioning of the mirror and the remaining transforms are constant for a given screen and projector position. The total transform can be measured for any mirror position, as represented by Equation 37a.

$$T_{measured} = T_L T_c(n) T_R \quad \text{Equation 37a}$$

For any given value of the mirror normal (n) the measured transform can be determined. It is desired to determine the constant value of both the left on right transforms and to discover a way to construct the center transform from the value of the mirror normal vector. Rearranging Equation 37a yields Equation 37b.

$$T_{measured} T_R^{-1} = T_L T_C(n) \quad \text{Equation 37b}$$

For a given screen setup the left transform can be determined empirically as described previously. Also, for a given known mirror position, the measured transform can be determined. Once this is done, the above matrix equation becomes 16 equations with 32 unknowns since each element on the left side of the equation is a linear function of the unknown elements in the inverse of the right transform and each element on the right side is a linear function of the unknown elements of the center transform.

By moving the mirror and re-determining the transform no additional unknowns are introduced on the left side of the equation but a completely unknown center transform results. Therefore, each additional mirror position measurement adds 16 equations and 16 unknowns. Because of this the center transform must be examined more carefully to reduce the total number of unknowns. The right-most contributing transform to the center transform of Equation 35 is a mirror transform, which is known by the position of the mirror measured in the mirror coordinate system. The next transform is an origin translation which consists generally of three unknowns. However, the magnitude of the translation is the distance between the mirror and virtual pinhole coordinate systems which is equal to the distance between the mirror and the actual pinhole. Therefore, the magnitude of the translation is constant for all mirror and screen positions. Calling the pinhole to mirror origin vector p the transform becomes as in Equation 38.

$$O(P_v, m) = \begin{bmatrix} 1 & 0 & 0 & p_x \\ 0 & 1 & 0 & p_y \\ 0 & 0 & 1 & p_z \\ 0 & 0 & 0 & 1 \end{bmatrix}$$

Equation 38

This means that this contributing transform only has two additional unknowns for each mirror position. The third transform is the projection. By the alignment of the mirror coordinate system, the screen normal vector N is parallel to the mirror coordinate z-axis so the transform can be represented by a single unknown, as in Equation 39.

$$P(N) = \begin{bmatrix} 1 & 0 & 0 & 0 \\ 0 & 1 & 0 & 0 \\ 0 & 0 & 1 & 0 \\ 0 & 0 & \frac{1}{N} & 0 \end{bmatrix}$$

Equation 39

The next transform moves the origin back to the mirror coordinate system. Since the operations following the previous translation do not affect the orientation or scaling of the coordinate system, this translation is the negative of the previous one, and is shown in Equation 40.

$$O(m, P_v) = \begin{bmatrix} 1 & 0 & 0 & -p_x \\ 0 & 1 & 0 & -p_y \\ 0 & 0 & 1 & -p_z \\ 0 & 0 & 0 & 1 \end{bmatrix}$$

Equation 40

The final transform converts between the mirror and the screen coordinate system. The stipulation that the mirror and screen coordinate systems are aligned considerably simplifies this transformation. The result is Equation 41.

$$C(s, m) = \begin{vmatrix} -1 & 0 & 0 & 0 \\ 0 & 1 & 0 & 0 \\ 0 & 0 & -1 & z_o \\ 0 & 0 & 0 & 1 \end{vmatrix}$$

Equation 41

In Equation 41, $z_0$ it is the distance between the two coordinate systems. Multiplied together these contributing transforms result in Equation 42.

$$T_c(n) = \begin{bmatrix} -1 & 0 & \frac{p_x}{N} & \frac{p_x p_z}{N} - p_x \\ 0 & 1 & -\frac{p_y}{N} & p_y - \frac{p_y p_z}{N} \\ 0 & 0 & \frac{p_z + z_o}{N} - 1 & \left(\frac{p_z + z_o}{N} - 1\right) p_z \\ 0 & 0 & \frac{1}{N} & \frac{p_z}{N} \end{bmatrix} M(n)$$

Equation 42

Noticing that $N = p_z + z_0$ yields Equation 43.

$$T_c(n) = \begin{bmatrix} -1 & 0 & \frac{p_x}{p_z + z_o} & -\frac{p_x z_o}{p_z + z_o} \\ 0 & 1 & -\frac{p_y}{p_z + z_o} & \frac{p_y z_o}{p_z + z_o} \\ 0 & 0 & 0 & 0 \\ 0 & 0 & \frac{1}{p_z + z_o} & \frac{p_z}{p_z + z_o} \end{bmatrix} M(n)$$

Equation 43

The values of $p_x$, $p_y$, and $p_z$ change with mirror position. However, the value can be transformed from the virtual pinhole to the real pinhole by Equation 44.

$$P = M(n)p$$

Equation 44

In Equation 44, P is the fixed vector from the origin of the mirror system to the actual pinhole and p is the vector to the virtual pinhole. Performing the transform and explicitly substituting the values into the center transform yields Equation 45.

$$T_c(n) =$$

Equation 45

$$\begin{bmatrix} -1 & 0 & \frac{P_x - 2n_x P \cdot n}{P_z - 2n_z P \cdot n + z_o} & -\frac{(P_x - 2n_x P \cdot n) z_o}{P_z - 2n_z P \cdot n + z_o} \\ 0 & 1 & -\frac{P_y - 2n_y P \cdot n}{P_z - 2n_z P \cdot n + z_o} & \frac{(P_y - 2n_y P \cdot n) z_o}{P_z - 2n_z P \cdot n + z_o} \\ 0 & 0 & 0 & 0 \\ 0 & 0 & \frac{1}{P_z - 2n_z P \cdot n + z_o} & \frac{P_z - 2n_z P \cdot n}{P_z - 2n_z P \cdot n + z_o} \end{bmatrix} M(n)$$

At first glance this seems to have complicated the transform. This is not the case. The previous transform had three unknowns which vary with mirror position. The unknowns in this transform are all invariant with mirror position. This means that the determination of the total transform at multiple mirror positions introduces no additional unknowns and therefore the unknown fixed values comprising the three contributing transforms can be determined with sufficient measurement. Because the relationships between the unknowns do not results in linear equations, the determination of P and $z_0$ is still not a trivial task.

The values for P and $z_0$ can be determined by using a two-step linear least squares approach. First define the unknown matrix above as in Equation 46.

$$\begin{bmatrix} -1 & 0 & \frac{P_x - 2n_x P \cdot n}{P_z - 2n_z P \cdot n + z_o} & -\frac{(P_x - 2n_x P \cdot n) z_o}{P_z - 2n_z P \cdot n + z_o} \\ 0 & 1 & -\frac{P_y - 2n_y P \cdot n}{P_z - 2n_z P \cdot n + z_o} & \frac{(P_y - 2n_y P \cdot n) z_o}{P_z - 2n_z P \cdot n + z_o} \\ 0 & 0 & 0 & 0 \\ 0 & 0 & \frac{1}{P_z - 2n_z P \cdot n + z_o} & \frac{P_z - 2n_z P \cdot n}{P_z - 2n_z P \cdot n + z_o} \end{bmatrix} =$$

Equation 46

-continued $$\begin{bmatrix} -1 & 0 & A_1 & -A_1 z_0 \\ 0 & 1 & -A_2 & A_2 z_0 \\ 0 & 0 & 0 & 0 \\ 0 & 0 & A_3 & A_4 \end{bmatrix} = A$$

Now the transformation takes on the form of Equation 47.

$$T_L^{-1} T_{measured} T_R^{-1} = \begin{bmatrix} -1 & 0 & A_1 & -A_1 z_0 \\ 0 & 1 & -A_2 & A_2 z_0 \\ 0 & 0 & 0 & 0 \\ 0 & 0 & A_3 & A_4 \end{bmatrix} M(n) \quad \text{Equation 47}$$

As discussed before $T_L$ it can be measured using the large format projector and any suitable screen. For any given mirror position (n) $T_{measured}$ is determined by correlating positions on the two projector images as measured at the screen. This means that the remaining unknowns are the elements of $T_R^{-1}$, $A_1$, $A_2$, $A_3$, $A_4$, and $z_0$ for a total 21 unknowns. The transform $T_R^{-1}$ is invariant with mirror position but A is depending on the mirror position. This means that a sufficient number of equations can be generated by determining $T_{measured}$ at a suitable number of mirror positions. Each mirror position produces 16 equations. However, since each position only adds four unknowns ($A_1$, $A_2$, $A_3$, $A_4$) to the system, measurement of as little as two mirror positions can be sufficient to perform a least squares analysis and determine all the needed values.

The use of multiple mirror positions gives multiple values for A, but the linear regression will determine the A matrix for each mirror position. Once the family of A matrices are determined, a second linear least squares can be used to determine the values of P and $z_0$. This can be cone because the determined elements of A can be combined with the algebraic definition of the matrix to construct a series of linear equations. These linear equations are in Equation 48.

$$\begin{bmatrix} 1-2n_x^2 & -2n_x n_y & -2n_x n_z & 0 \\ -2n_x n_y & 1-2n_y^2 & -2n_y n_z & 0 \\ -2n_z n_x & -2n_z n_y & 1-2n_z^2 & 1 \end{bmatrix} \begin{bmatrix} P_x \\ P_y \\ P_z \\ z \end{bmatrix} = \frac{1}{A_3} \begin{bmatrix} A_1 \\ A_2 \\ 1 \end{bmatrix} \quad \text{Equation 48}$$

These equations can be used similarly to the technique described in empirical determination of a homogeneous transform to construct a linear least squares fit to the unknown values.

Standard data analysis techniques may be used to calculate the regressions and transforms. Computer programming languages (C, basic, etc) or engineering calculation software (Mathcad, Matlab, etc) can be useful tools in this calculation. The display hardware determines the parameters for possible graphics software packages used in a particular system. For our example implementation LCD projectors were used, so any input compatible with the projector was sufficient. If the $2^{nd}$ projector were mounted to a pan and tilt platform, similar transformations could be used. The transforms could be derived using a platform coordinate system instead of the mirror coordinate system. A similar system of matrices would result, with the absence of the mirror reflection transformation and the inclusion of the motion platform coordinate conversion transformation.

Other configurations could be similarly derived. Consideration should be given to choice of coordinate systems, alignment of coordinate systems, degrees of freedom of the system, choice of steering system, and transformations of the optical paths of the images. If these system parameters for a particular setup are chosen carefully, the homogeneous transforms can remain relatively straightforward. Additionally, the choice of lenses used with projection systems can be important. It is desirable to minimize radial or other non-linear distortion in both images. Nonlinear transformation schemes exist to compensate for some these distortions, but they can be difficult to implement.

EXAMPLE IMPLEMENTATION

A system according to the present invention is depicted in FIG. 2. The system used two Proxima (trademark of Proxima Corporation) 9200 projectors, each having a maximum image resolution of 1024×728 picture elements. See "Proxima Desktop Projector 9200 User's Guide", Proxima Corporation. One projector was fitted with a short focal length lens; the other with a variable focal length zoom lens. The longer zoom lens was supported to prevent movement of its optical axis.

A Model PTU-46-17.5 pan and tilt unit from Directed Perception, Inc., modified to provide access to the line where the pan and tilt axes intersect, was used to direct the high output of the second projector. See "Pan-tilt Unit User's Manual", Directed Perception, Inc. That model has a resolution of 0.0514° and can achieve speeds of 300° per second. The pan-tilt unit was controlled by a computer through a standard serial port.

The second projector's optical axis was directed towards the center of rotation of the mirror. An aperture was used to block some of the high intensity light and provide a longer depth of focus for the long focal length lens. A ½" diameter aperture was placed between the $1^{st}$ and $2^{nd}$ lenses inside the zoom lens assembly. This provided an adequate depth of focus. However, minor interference patterns and color distortion can be present in this setup. Neutral density filters can be used to further reduce the intensity of the high resolution image. Two video inputs are necessary for the system, one for the main projector and one for the enhanced image. For an initial prototype and testing, two VGA laptop computers were used to produce the images and control the mirror assembly. The tested resolution was set at 640×480 pixels (due to the laptop capabilities) on each computer and projector. At this resolution, the projectors could be set to the expanded display setting.

CALIBRATION

Those skilled in the art will appreciate various methods for determining the values suitable for the transform. One example, used with the example implementation above, is described below.

Drafting vellum with 0.1 inch grid can be applied to a hard surface screen as a background for the images and means of recording data. The screen can be positioned so that it is approximately parallel with the front edge of the system, and then aligned parallel to the mirror surface. During the calibration of the system, the display screen can be aligned with the front surface mirror using a visible laser calibration tool. A laser can be mounted in a block such that the light emitted is perpendicular to the bottom surface of the block. The system can then be adjusted by placing the bottom of the block on the flat screen, and adjusting the screen (or projector apparatus or mirror) so that the display screen is parallel to a mirror position (when the laser reflects back upon itself). The position of the mirror at this alignment can be recorded, and then used to create the fixed mirror coordinate system. The pan-tilt can then be rotated 90° about the pan axis, and the point where the tilt axis intersects the screen located. This defines the 0,0 screen coordinate for measurement of the data.

A grid of data points (spaced at 40 by 40 pixels over the entire image) can be projected to the screen through the mirror, and to the screen from the main projector. Each grid point can be recorded on the vellum, and the mirror position noted. Once a few mirror position grids and the main grid are recorded, the physical x,y coordinates of each grid point can be written into a data file along with the pixel location of each point. The amount of grid points is much greater than actually needed, but provides an over determined system for the linear regression technique for finding the measured transform from the measured data. The transform can then be found using the method described in the above.

If P and $z_0$ can be measured or estimated, then the transform can be determined without a double regression. The long focal length of a zoom lens on the second display source allows for a "pinhole" projection model to be used. An approximation for the focal distance of the lens can be calculated using Equation 49.

$$\frac{w_1}{w_2} = \frac{f_1}{f_2}; f_1 + f_2 = z_0 + z_{mb} \qquad \text{Equation 49}$$

In Equation 49, $w_1$ is the width of the LCD panel inside the projector, $w_2$ is the width of the image of the screen, $f_1$ is the distance from the pinhole to the LCD, $f_2$ is the distance from the pinhole to the screen, $z_0$ is the distance from the mirror center of rotation to the screen and $z_{mb}$ is the distance from a mirror center of rotation to the LCD panel (the magnitude of the constant P vector). Solving this system for $f_1$ can provide a reasonable measure of effective focal length of the lens.

Next, the "pinhole" vector P and the orientation of the enhanced image LCD can be found utilizing one position of the mirror and ray tracing. If it is assumed mathematically that the z axis of the screen and the LCD intersect at the mirror center of rotation, the screen coordinate of the x,y pixel located on the optical axis can be found in mirror coordinates. Reflecting this normalized vector from the mirror provides the unit direction of the optical axis. Since the magnitude is known, the P vector is now known. The screen coordinate of the pixel representing the maximum x value on the LCD can be used to determine the orientation of the x axis in mirror coordinates. Thus, the orientation of the LCD can be determined.

From this, the $T_R$ matrix can be created using the equation $T_R$=ABC where C consists of a scaling and translation matrix to transform computer coordinates into inches, B is the rotation from the LCD system to the mirror coordinate system and A is translation from the LCD origin to the mirror coordinate system origin. This is the complete transform from the LCD to mirror coordinates, and is dependent only on the pinhole. This transform remains constant for a given screen setup.

The next part of the transform is created using Equation 50.

$$T_C = C(s,m)O(m, Pv)P(N)O(Pv,M)M(n) \qquad \text{Equation 50}$$

Components of Equation 50 are given by Equation 51, where p, is the location of the virtual pinhole in mirror coordinates, $z_0$ is the distance to the screen, and n is the mirror normal vector in mirror coordinates. A new transform can be created for each mirror position.

$$M(n) = \begin{bmatrix} 1-2\cdot(n_x)^2 & -2\cdot n_x\cdot n_y & -2\cdot n_x\cdot n_z & 0 \\ -2\cdot n_x\cdot n_y & 1-2\cdot(n_y)^2 & -2\cdot n_y\cdot n_z & 0 \\ -2\cdot n_x\cdot n_z & -2\cdot n_y\cdot n_z & 1-2\cdot(n_z)^2 & 0 \\ 0 & 0 & 0 & 1 \end{bmatrix} \quad \text{Equation 51}$$

$$O(P_v, m) = \begin{bmatrix} 1 & 0 & 0 & -p_{v_x} \\ 0 & 1 & 0 & -p_{v_y} \\ 0 & 0 & 1 & -p_{v_z} \\ 0 & 0 & 0 & 1 \end{bmatrix}$$

$$P(N) = \begin{bmatrix} 1 & 0 & 0 & 0 \\ 0 & 1 & 0 & 0 \\ 0 & 0 & 1 & 0 \\ 0 & 0 & \frac{1}{-p_{v_z}+z_0} & 0 \end{bmatrix}$$

$$O(m, P_v) = \begin{bmatrix} 1 & 0 & 0 & v_x \\ 0 & 1 & 0 & p_{v_y} \\ 0 & 0 & 1 & p_{v_z} \\ 0 & 0 & 0 & 1 \end{bmatrix}$$

$$C(s, m) = \begin{bmatrix} -1 & 0 & 0 & 0 \\ 0 & 1 & 0 & 0 \\ 0 & 0 & -1 & z_0 \\ 0 & 0 & 0 & 1 \end{bmatrix}$$

Multiplication of this transform by the $T_L$ matrix (measured transform from screen coordinates to main screen computer coordinates) completes the transformation from enhanced image computer coordinates to main screen computer coordinates. Inverting this completed transform provides the transform from main screen computer coordinates to enhanced image coordinates.

In order to calculate where the enhanced image should be drawn, the mirror normal can be found based on the screen coordinate that the axis pixel should be located. Knowing this point and the location of the pinhole in mirror coordinates, the mirror normal can be found by subtracting the normalized vector to the pinhole from the negative of the unit vector to the screen position (all in mirror coordinates) and then normalizing the result. The pan and tilt steps to produce this normal can be found by solving the following system of equations.

The relative angles to the mirror coordinate system can be calculated using Equation 52.

$$-n_x = \sin(\theta p)\cdot\cos(\theta t) \quad -n_y = \sin(\theta t) \quad -n_z = (\cos(\theta p)\cdot\cos(\theta t)) \qquad \text{Equation 52}$$

In Equation 52, $\theta p$=relative pan angle in mirror coordinates and $\theta t$=relative tilt angle in degrees in mirror coordinates. The pan and tilt encoder steps can be found by Equation 53, where $pan_0$ and $tilt_0$ are the encoder steps used to define the mirror coordinate system.

$$\text{pan}=-(\theta p\cdot 1114.0849-\text{pan}_0) \quad \text{tilt}=\theta t\cdot 1114.0849-\text{tilt}_0 \qquad \text{Equation 53}$$

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A video display system for displaying an image on a display medium comprising:
    a first video source means mounted relative to the display medium for displaying a first portion of the image at a first resolution;
    a second video source means mounted relative to the first video source means and the display medium, for displaying a second portion of the image at a second resolution, the second portion overlaying a subset of the first portion, the second portion moving over the first portion;
    an image transformer means for generating an input to the second video source means by performing a transform, wherein the input is changeable over time and aligns the second portion to the first portion, the second portion moving over the first portion, the image transformer means comprising:
        means for determining a first image plane transform by determining a correlation between an image plane corresponding to the first video source means and the display medium;
        means for determining a plurality of image plane correlations between the display on the display medium of the image plane corresponding to the first video source means and an image plane corresponding to the second video source means, each of the plurality of correlations corresponding to a configuration of the second video source means, wherein the configuration of the second video source means is changeable over time and corresponds to the second portion moving over the first portion;
        means for determining a second image transform as a function of the configuration of the second video source means, from the first image plane transform and the plurality of image plane correlations;
        means for providing the input to the second video source means, said input being compensated for relative configurations for the first video source means, the second video source means and the display medium.

2. The video display system of claim 1, wherein the second video source means comprises a video driver and an image steerer means for directing optical energy from the video driver to the display medium.

3. The video display system of claim 2, wherein the first video source means comprises a first projector, and said video driver comprises a second projector, said image steerer means being mounted relative to the second projector.

4. The video display system of claim 3, wherein said image steerer means comprises a mirror capable of pan and tilt motion.

5. The video display system of claim 4, wherein the pan and tilt motion of said mirror is controlled by a computer.

6. A method for displaying an image on a display medium comprising:
    displaying with a first video source a first portion of the image at a first resolution;
    displaying with a second video source a second portion of the image at a second resolution, the second portion overlying a subset of the first portion, the second portion moving over the first portion;
    generating an input to the second video source by performing a transform, wherein the input is changeable over time and aligns the second portion to the first portion, the second portion moving over the first portion, the transform comprising:
        determining a first image plane transform by determining a correlation between an image plane corresponding to the first video source and the display medium;
        determining a plurality of image plane correlations between the display on the display medium of the image plane corresponding to the first video source and an image plane corresponding to the second video source, each of the plurality of correlations corresponding to a configuration of the second video source, wherein the configuration of the second video source is changeable over time and corresponds to the second portion moving over the first portion;
        determining a second image transform as a function of the configuration of the second video source, from the first image plane transform and the plurality of image plane correlations; and
    providing the input to the second video source, said input being compensated for relative configurations of the first video source, the second video source, and the display medium.

7. The method of claim 6, wherein:
    the plurality of image plane correlations has sufficient number that the number of unknown parameters in the second image transform is less than the number of equations resulting from the plurality of image plane correlations; and
    the second image transform is determined from a linear regression on the plurality of image plane correlations.

8. A method of determining an image transform for aligning first and second images to be displayed on a display medium, wherein the second image is overlaying and moving over the first image by changing the configuration of a second video source, wherein the display of the first image has an associated first image plane and the display of the second image has an associated second image plane, comprising:
    determining a first image plane transform by determining a correlation between the first image plane and the display medium;
    determining a plurality of image plane correlations between the display on the display medium of the first image plane and the second image plane, each of the plurality of correlations corresponding to a configuration of the second video source, wherein the configuration of the second video source is changeable over time and corresponds to the second image moving over the first image;
    determining the image transform as a function of the configuration of the second video source from the first image plane transform and the plurality of image plane correlations.

9. The method of claim 8, wherein:
    the plurality of image plane correlations has sufficient number that the number of unknown parameters in the image transform is less than the number of equations resulting from the plurality of image plane correlations; and the image transform is determined from a linear regression on the plurality of image plane correlations.

* * * * *